INVENTORS:
Robert H. Martin
Robert A. Clark

April 13, 1965

R. H. MARTIN ETAL 3,178,206

POLYTETRAFLUOROETHYLENE TUBULAR TAILPIECE CONNECTING A BASIN TO GLASS PIPE

Filed Oct. 10, 1961

INVENTORS:
Robert H. Martin
Robert A. Clark

BY:

ATTORNEYS

United States Patent Office 3,178,206
Patented Apr. 13, 1965

3,178,206
POLYTETRAFLUOROETHYLENE TUBULAR TAIL-
PIECE CONNECTING A BASIN TO GLASS PIPE
Robert H. Martin, Skokie, and Robert A. Clark, La
Grange, Ill., assignors to Chicago Gasket Company,
Chicago, Ill., a corporation of Illinois
Filed Oct. 10, 1961, Ser. No. 144,159
2 Claims. (Cl. 285—161)

This invention relates to a tailpipe and particularly to a tailpipe for use with basins that are employed to dispose of corrosive material.

In basins used in laboratories or other locations where corrosive material is encountered, the usual metal tailpipe is unsatisfactory for several reasons. The metal in the tailpipe is subject to corrosion and the packing material which maintains the seal may also be corroded thereby destroying the seal. In these corrosive environments it is customary to use glass piping rather than metal and it is also highly desirable to employ a more positive seal than the packing gland that seals the usual slip joint between the trap and the tailpipe.

Although glass is a suitable material for pipes, it is not a suitable material for a tailpipe since the pressure required to seal the tailpipe to the basin is difficult to apply without breaking a glass flange and because objects dropped into the basin hitting directly on a glass flange would cause it to break. A very suitable material for a tailpipe in a corrosive environment is Teflon (polytetrafluoroethylene) or similar corrosion-resistant synthetic plastics. There are many corrosion-resistant plastics that are suitable for use in this invention, and as such, when the name "Teflon" or "polytetrafluoroethylene" is used in the specification and claims, all suitable corrosion-resistant plastics are intended to be included in that term. Besides being almost completely resistant to corrosion, Teflon is rigid enough to hold its shape under considerable pressure, tough enough to resist breakage, readily machinable, and it can be molded into intricate shapes. In spite of these desirable properties, however, Teflon is not extensively used for this purpose because the cost of Teflon tailpipes of conventional construction is prohibitively high.

It is an object of this invention to provide a tailpipe assembly that is resistant to breakage and corrosion, that forms a positive seal with a glass trap and that is made in a novel form that may be constructed employing so little material that it may be made of expensive, corrosion-resistant synthetic plastics without its cost being prohibitive.

It is another object of this invention to provide a tailpipe that is directly connectible to glass piping without packing to form a single positive seal that does not expose metal, packing, or associated elements of the structure to corrosive material.

These and other objects of this invention are obtained with a tailpipe and tailpipe assembly which are constructed of a very limited amount of Teflon but which obtain the benefits of a non-metallic, breakage resistant, positive sealing, packing-free drainage means for a basin. Tailpipes and tailpipe assemblies embodying this invention are illustrated in the accompanying drawings in which.

Figure 1:
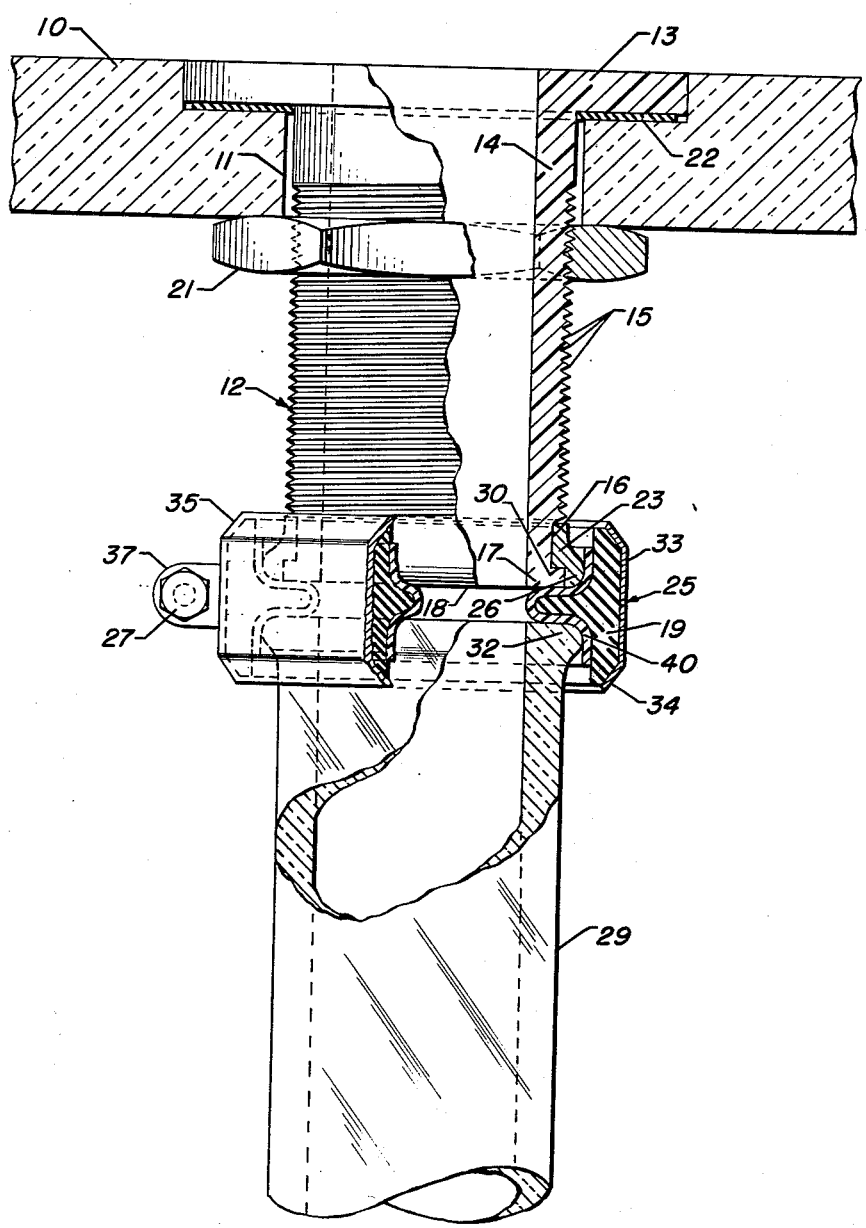
FIG. 1 is a partial sectional elevational view of a tailpipe assembly embodying this invention.
Figure 2:
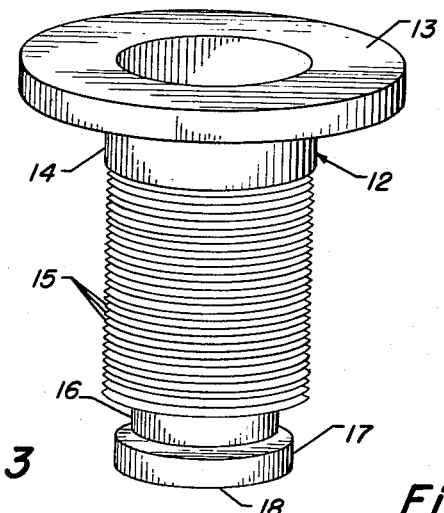
FIG. 2 is a perspective view of the tailpipe of FIG. 1.
Figure 3:
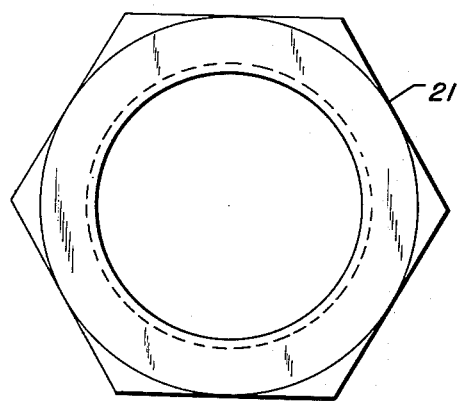
FIG. 3 is a plan view of a compression nut suitable for use in this assembly.
Figure 4:
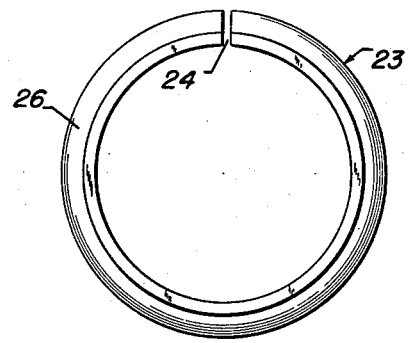
FIG. 4 is a plan view of a slotted insert suitable for use in this assembly.
Figure 5:
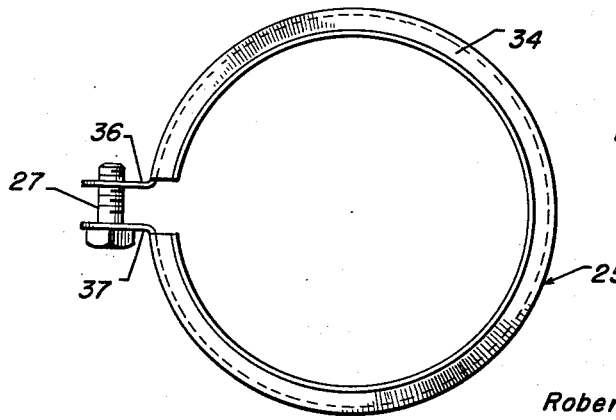
FIG. 5 is a plan view of a one-bolt coupling suitable for use in this assembly.

In FIG. 1, the reference numeral 10 represents a fragment of the bottom of a basin having an opening 11 for waste disposal. Within the opening 11 a tailpipe 12 is assembled. The tailpipe 12 has a flange 13 which is adapted to nest in a similarly shaped cavity in basin 10 to form a flush fit with it. A cylindrical portion 14 of the tailpipe 12 passes completely through the bottom opening of basin 10 and extends beyond the opening. The lower portion of the cylindrical portion 14 is threaded with threads 15 that terminate in an indented portion 16 which in turn terminates in a rim 17.

The tailpipe is assembled on the basin by inserting the cylindrical portion through the basin opening 11 until the flange 13 is in contact with the inside of the basin 10, preferably in a cavity of the same diameter as the flange. It is important, to obtain unitary structure, that the rim 17 is constructed with a smaller outside diameter than the crest diameter of the threads 15 and, as such, the tailpipe can be slipped through the opening 11 in the basin, and retaining nut 21 may be slipped over the rim 17 and engaged with threads 15 until it comes in contact with the bottom of basin 10 where it can be tightened to exert sufficient force between basin 10 and flange 13 to effect a liquid seal. As is apparent from the drawings, while the outer rim diameter is less than the crest diameter of the threads, the difference is slight and as such it may be said that the outer rim diameter and the thread crest diameter are substantially the same. These may vary of course, the important thing being that the nut 21 may be slipped over the rim 17 to engage threads 15. When necessary, a gasket 22, or equivalent sealing material such as tar, cement, putty, etc., may be disposed between the basin 10 and the flange 13 to aid in effecting a seal therebetween.

A spring insert 23 having a generally annular contour with its interior surface shaped to engage both rim portion 17 and the indented cylindrical portion 16 is employed to connect the tailpipe assembly of this invention to glass piping. The spring insert 23 is made with a slot 24 completely through the insert so that its unsprung diameter may be increased by enlarging the width of the slot 24. The smallest unsprung internal diameter of insert 23 is about the same as the outside diameter of cylindrical portion 16 so that when insert 23 is placed around the indented cylindrical portion 16 and restrained from expanding, the shoulder 30 will form a positive engagement with rim 17 of tailpipe 12. The outside contour of spring insert 23 is cylindrical except for a terminal bead 26 that is the same size and shape as the bead on the edge of standard glass piping and positioned with its bottom short of the bottom of the tailpipe. The spring insert, with this construction and acting cooperatively with the rim 17, permits the use of a small rim that in turn allows the tailpipe to be of unbroken, one-piece construction and permits the tailpipe to be of small dimensions and thereby made of a small amount of material. Furthermore, this construction is such that the spring clip forms no part of the seal and is not contacted by the fluid passing through the pipe. Therefore, this spring clip may be made of any type of suitable material without regard to its corrosion-resistant properties, and it need not be machined to fit in liquid-tight relation to the rim 17.

Glass pipe 29 having a bead 32 at the edge may be coupled in liquid-tight relationship to the tailpipe assembly with a rubber gasket 19 clad in a Teflon lining 40 and a metal coupling 25. Although any equivalent coupling may be used, the coupling 25 shown is a strip of springy metal, such as steel, that is bent to a cross section consisting of a central cylindrical section 33 and two truncated conical sections 34 and 35 extending from central section 33. At the ends of the strip, ear portions 36 and 37 extend radially outward and in registering positions. These ear portions have holes through which a bolt 27 passes, and when bolt 27 is tightened the diameter of the coupling decreases compressing gasket 19 both radially and axially. The Teflon clad rubber gasket is placed between the end of the tailpipe and the beaded glass pipe, and when this gasket is compressed by the metal coupling, the resultant force exerted by the truncated conical segments force the ends of the tailpipe and the glass pipe together to form a liquid seal with the portion of the gasket in the butt joint. The tailpipe assembly of this invention may be connected to any shape glass pipe, including straight pipe, bends, traps, T's, elbows, etc., and it is further contemplated that pipe 29 may be of materials other than glass.

The tailpipe of this invention is extremely short vertically and therefore may be made from a minimum of material. Furthermore, the contour of tailpipe 12 is readily adaptable to being made in a molding process, with only relatively simple finishing machining required, for example, to produce threads 15 and put a finish surface on other parts. The production of threads 15 and the surface finishing do not remove much material from tailpipe 12 and, therefore, the entire process of manufacture is extremely conservative of material. By eliminating the long slip fit of most tailpipes and by eliminating machining associated with those that do not have slip fits, the tailpipe of this invention may be produced at very small cost compared with other articles for the same purpose. In addition to its small cost, the tailpipe of this invention provides a direct and positive seal between it and other piping.

The structure of the tailpipe hereinabove described is capable of forming a corrosion-proof piping system at a reasonable cost because it is constructed with all parts except those made of glass, Teflon or other corrosion-resistant material, out of contact with the corrosive material. Elements of the combination, such as coupling 25, spring insert 23, and retaining nut 21 and others may be of any metal, plastic, fiber or other material. The structure of this invention, by employing specially shaped small quantities of Teflon in combination with other structural elements permits the use of other less expensive materials for most of the structure by effecting a unitary, direct and positive connection between the tailpipe and the trap.

Having thus described the invention, what is claimed is:

1. A tailpipe assembly comprising in combination a basin having a bottom opening, a glass pipe having a beaded edge, a tailpipe comprising a tubular, unitary polytetrafluoroethylene member having an intermediate threaded cylindrical portion, a terminal flange, a terminal rim and an intermediate cylindrical indented portion, with said indented portion adjacent said rim, said threaded cylindrical portion adjacent said indented portion and terminating on the other side thereof in said flange, said rim being of smaller diameter than the crest diameter of the thread of said cylindrical portion with said flange in contact with an upper surface of said basin and said cylindrical portion protruding beneath said basin through said bottom opening, a retaining nut engaged with said threads and in contact with the bottom surface of said basin with sufficient force to produce a liquid seal between said flange and said basin, a slotted spring insert having an unsprung inside diameter substantially equal to the outside diameter of said indented cylindrical portion and terminating in a beaded edge of the same outside diameter as the beaded edge of said glass pipe, with said insert surrounding and in contact with said indented cylindrical portion and abutting said rim, a resilient gasket clad with polytetrafluoroethylene between said tailpipe and said glass pipe, a split circular coupling having a vertical central segment, two truncated conical segments extending from said central segment and two ears with registering holes through which a threaded fastener passes, said ears forming said split, said coupling surrounding said assembly with the truncated conical segments thereof exerting axial force against the beads on said glass pipe and said spring insert respectively whereby tightening said threaded fastener forces said beads into said gasket to form a liquid-tight seal.

2. A tailpipe assembly for a basin having a bottom opening comprising in combination a glass pipe having a beaded end edge, a tailpipe comprising a tubular unitary polytetrafluorothylene member having a terminal flange, a terminal rim and an intermediate cylindrical portion, said intermediate cylindrical portion including a thread and defining an indented cylindrical portion adjacent said rim, said thread terminating proximate said indented portion and proximate said flange, said rim being of a substantially equal diameter to the crest diameter of the thread, a retaining nut engaged with said thread for contacting the bottom surface of a basin with sufficient force to seal said flange to a basin, and insert means having an inner diameter substantially equal to the outside diameter of said indented cylindrical portion and terminating in a beaded portion of substantially the same outside diameter as the beaded edge of said glass pipe, said insert means being positioned in contact with said indented cylindrical portion, and surrounding the same and further abutting said rim to cooperate with said rim to define a beaded end edge for said tailpipe, a gasket adjacent the beaded end edges of said glass tube and said tailpipe, and coupling means surrounding the beaded end edges of said tailpipe and said glass pipe for urging the beaded end edges of said glass pipe and said tailpipe toward each other thereby to form with said gasket a fluid-tight seal between said tailpipe and said glass pipe.

References Cited by the Examiner
UNITED STATES PATENTS

| | | | |
|---|---|---|---|
| 1,033,196 | 7/12 | Roesch | 285—423 |
| 1,622,773 | 3/27 | Fahnenschmidt | 285—158 |
| 1,857,297 | 5/32 | Faulkner | 285—415 |
| 2,026,674 | 1/36 | Edwards | 285—415 |
| 2,426,423 | 8/47 | Woolsey | 285—233 |
| 2,568,414 | 9/51 | Russ | 285—414 |
| 2,569,333 | 9/51 | Peterson | 285—414 |
| 2,736,040 | 2/56 | Mackey | 4—287 |
| 2,828,986 | 4/58 | Mahoff | 285—233 |
| 3,004,780 | 10/61 | Main | 285—423 |
| 3,084,959 | 4/63 | Stanton | 285—233 |
| 3,085,820 | 4/63 | Pollia | 285—415 |

FOREIGN PATENTS

| | | |
|---|---|---|
| 1,077,197 | 4/54 | France. |
| 652,054 | 4/51 | Great Britain. |
| 735,271 | 8/55 | Great Britain. |
| 834,853 | 5/60 | Great Britain. |
| 913,904 | 12/62 | Great Britain. |

OTHER REFERENCES

Pyrex, "Double-Tough Glass Pipe and Fitting," Corning Glass Works, Corning, N.Y.; pages 3, 15 and 16. This brochure was received in the U.S. Patent Office, Div. 57.

CARL W. TOMLIN, *Primary Examiner.*

THOMAS F. CALLAGHAN, *Examiner.*